No. 636,186. Patented Oct. 31, 1899.
H. G. SADGROVE.
SPEED RECORDER AND ODOMETER.
(Application filed Nov. 21, 1898.)
(No Model.) 2 Sheets—Sheet 1.
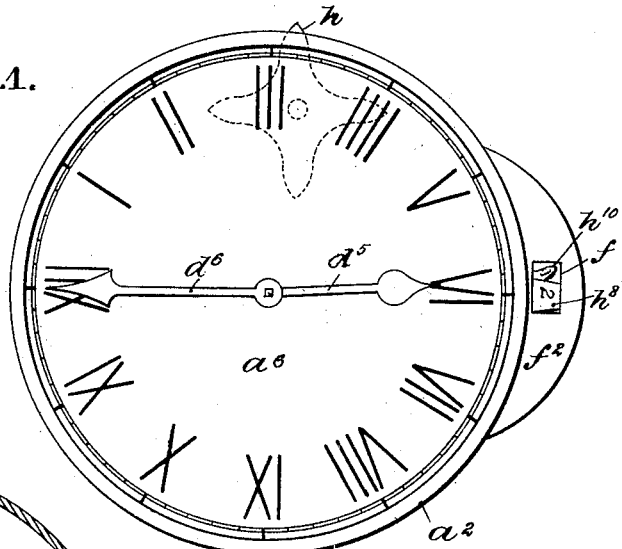
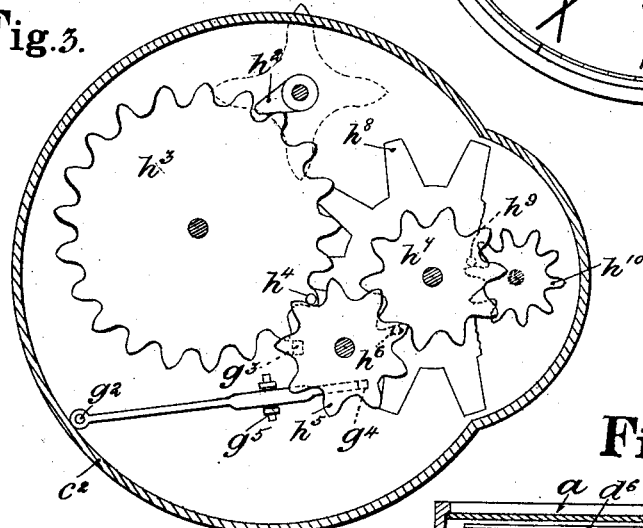
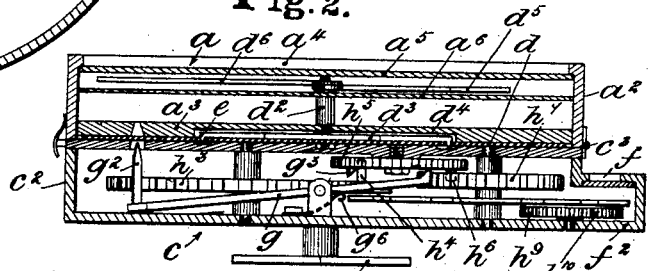
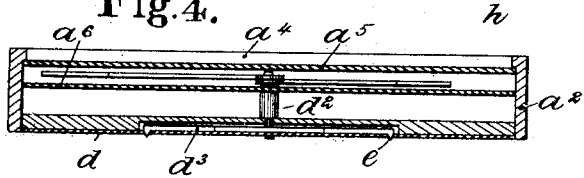
Witnesses
Geo. Fuery
J. F. Biddle
Inventor
Harry Groves Sadgrove
THE NORRIS PETERS CO., PHOTO-LITHO., WASHINGTON, D. C.

No. 636,186. Patented Oct. 31, 1899.
H. G. SADGROVE.
SPEED RECORDER AND ODOMETER.
(Application filed Nov. 21, 1898.)
(No Model.) 2 Sheets—Sheet 2.
Fig. 5.
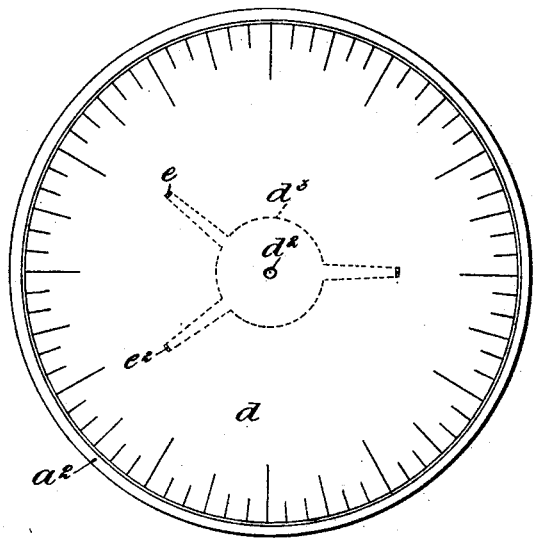
Fig. 6.
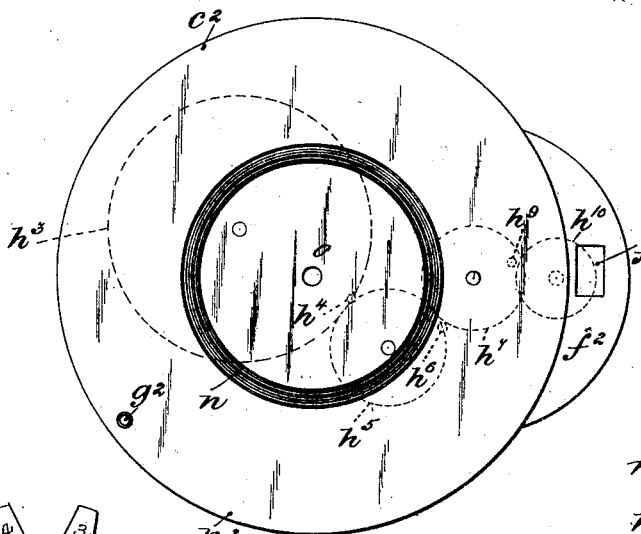
Fig. 7.
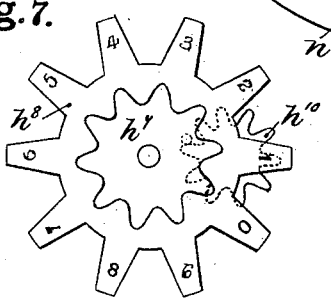
Fig. 8.
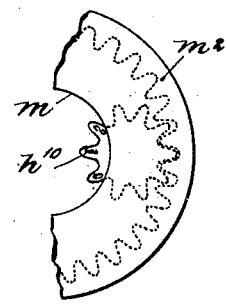
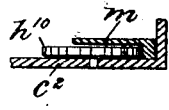
Witnesses
Geo. Fuery
A. B. Biddle
Inventor
Horace Groves Sadgrove
THE NORRIS PETERS CO., PHOTO-LITHO., WASHINGTON, D. C.

UNITED STATES PATENT OFFICE.

HORACE GROVES SADGROVE, OF BIRMINGHAM, ENGLAND.

SPEED-RECORDER AND ODOMETER.

SPECIFICATION forming part of Letters Patent No. 636,186, dated October 31, 1899.

Application filed November 21, 1898. Serial No. 697,026. (No model.)

*To all whom it may concern:*

Be it known that I, HORACE GROVES SADGROVE, surveyor, a subject of the Queen of Great Britain, residing at Aitken Chambers, 5 Cannon street, Birmingham, in the county of Warwick, England, have invented certain new and useful Improvements in Speed-Recorders and Odometers; and I do hereby declare the following to be a full, clear, and exact description of the invention, such as will enable others skilled in the art to which it appertains to make and use the same.

This invention has for its objects to provide a new and improved instrument for recording the distance traversed by and registering the speed of a wheeled vehicle, such as a cycle, and to provide a novel construction whereby the recording-dial can be conveniently and quickly renewed whenever occasion demands.

To accomplish these objects, my invention consists in the features of construction and the combination or arrangement of parts hereinafter described and claimed, reference being made to the accompanying drawings, in which—

Figure 1 is a face view of the complete instrument; Fig. 2, a vertical section thereof; Fig. 3, a horizontal section of the marking mechanism only; Fig. 4, a vertical section of that part only of the instrument carrying the recording-dial; Fig. 5, a face view of the said dial and of Fig. 4; Fig. 6, a face elevation of the marking mechanism, Fig. 3; and Fig. 7, a separate view of two of the principal parts of the ocular recording mechanism. Fig. 8 is a slightly-modified form of one of the rotating parts in Figs. 3 and 7.

Referring to the said figures, the instrument comprises two parts, the one, $a$, a mechanism for carrying and operating the recording-dial and for keeping time and the other, $c$, a marking mechanism for automatically operating upon the said dial and indicating the matter to be recorded, the said mechanisms being inclosed in a two-part casing $a^2$ $c^2$, which is hinged, as shown at $c^3$, or otherwise connected so that the parts lie against each other face to face when connected, but can be hinged away or separated from each other at any time to obtain access to the interior mechanism and to renew the recording-dial.

This last named takes the form of a paper or cardboard slip $d$ and is carried upon the hour-arbor $d^2$ of the mechanism $a$ through the intervention of a carrier-plate $d^3$, which is fixed to the said arbor, so as to rotate within a circular recess $d^4$, formed within the inner wall $a^3$ of the casing part $a^2$. The said paper or cardboard slip is arranged to freely rotate between the outer faces of the inner walls of the casing's two parts. The casing part $a^2$ is fitted with ordinary running-down time mechanism for operating the said carrier-plate and the hour and minute hands $d^5$ $d^6$, and its outer wall $a^4$ is fitted with a glass $a^5$ for the purpose of viewing the hands, as aforesaid, and a dial $a^6$ of the ordinary setting, which is inclosed within the said casing part.

One particular feature in the connection of the recording-dial to the carrier-plate $d^3$ is that the said carrier-plate has prearranged prongs or projections $e$ upon it to take into holes $e^2$ made through the recording-dial, so that the said dial can be only connected to the carrier-plate in one position and that true to time, as the said carrier-plate is itself set true to the hour-hand.

The recording-dial is divided into twelve hour-spaces, and these are subdivided into half-hour and ten-minute divisions, and the records are read therefrom by the number of markings which the spaces or divisions contain.

The marking and sight-recording mechanism is contained within the casing $c^2$, and comprises a lever or jointed arm $g$, carrying a pricker, pencil, or style $g^2$ and a train of wheels which are operated by the running part of the cycle and which operate the said marking-lever and bring into position before a sight-hole $f$ in an extension $f^2$ of the particular casing part indicating-disks or similar figured surfaces. The train of wheels shown in the drawings comprises a star-wheel $h$, carrying a tooth or cam $h^2$ upon its arbor and being operated by the running part of a cycle, so that the said tooth shall act upon another toothed wheel $h^3$ and rotate it one tooth for every four rotations of the cycle's running part and which said wheel $h^3$ carries upon it a pin or peg $h^4$, which turns an intermediate wheel $h^5$ one tooth for every complete rotation of the wheel $h^3$. This intermediate wheel $h^5$ also has upon it a pin or peg $h^6$, which works against the teeth of another tooth-wheel $h^7$, which carries upon it an indicating-disk $h^8$ for recording single miles, the said wheel $h^7$ driving another toothed wheel $h^{10}$ one tooth for a complete rotation of itself by means of a pin or projection $h^9$, the whole of the train of wheels forming a reducing one from the star-wheel $h$ to the toothed wheel $h^{10}$. The wheel $h^5$ carries upon its under face an inclined piece $g^3$, which is adapted at every complete rotation of the said wheel to wipe over the one end $g^4$ of the lever $g$ and rock it (the lever) upon its fulcrum-pin $g^5$, so that its pricker $g^2$ at its end momentarily pierces the paper while the said wiping takes place, the movement being a momentary one against the action of a spring $g^6$, which always tends to keep the end $g^4$ of the lever in the path of the inclined piece.

The wheels $h^7$ $h^{10}$ are only used for sight-indicating purposes, the first named setting forth through the disk $h^8$ the units of the milage and the last named the tens, as will be clearly seen from Fig. 1, and it will be observed from the said figure that the tens are carried upon the surface of the wheel $h^{10}$ and that the disk $a^8$ is cut away at parts to admit of the said letters being seen.

In Fig. 8 the tens letters are carried upon the face $m^2$ of a toothed annulus $m$ instead of upon the face of the wheel $h^{10}$, but the last named rotates the said annulus. The disk $h^8$ is in this case also used for the purpose of indicating the units. Both the annulus and the disk are arranged to rotate in view of the sight-hole $f$.

In order to insure decisive and clear perforations being made in the recording-dial by the pricker $g^2$, the said dial is confined between the two-part casing with only sufficient looseness to freely rotate, and to insure this the prongs or projections $e$ of the carrier-plate $d^3$ are let into and rotate within a clearance ring-groove $n$, formed in the outer face of the casing's wall $n^2$. In like manner is also let in the protruding end of the arbor $d^2$.

When the recording instrument is working, the recording-dial is continually but gradually being rotated by the hour-arbor of the clock mechanism, and the star-wheel $h$ is given a quarter-turn for every complete revolution of a cycle-wheel. As the ratio of the wheel $h$ to the wheels $h^3$ $h^5$ is as twenty-one to one and one hundred and eighty-nine to one, (the wheel $h^3$ having twenty-one teeth and the wheel $h^5$ nine teeth,) the wheel $h^5$ is rotated once every mile traveled by the cycle and the lever momentarily operated to prick the recording-dial, so that the rate of speed at which the cycle was running at any particular time is represented by the number of perforations or prickings contained within the subdivisions of the dial. For instance, if three prickings have been made in a ten-minutes' space that would indicate that the speed was eighteen miles per hour.

For each rotation of the wheel $h^5$ the indicating-disk $h^8$ is rotated one-tenth, (as the wheel $h^7$ has ten teeth,) and for each complete rotation of the wheel $h^7$ the wheel $h^{10}$ is rotated one-tenth, it having ten teeth.

The construction of the casing in two separable parts or sections and the detachable mounting of the recording-dial on the hour-arbor of the time mechanism through the medium of a carrier-plate enable the recording-dial to be easily and rapidly removed and a fresh dial applied whenever necessary.

Having now described my invention, what I claim, and desire to secure by Letters Patent, is—

1. The combination of the casing composed of two separable sections lying face to face when closed and one constructed with a central circular opening or recess, the time mechanism, the marking mechanism, the circular recording-dial carrier-plate mounted on the hour-arbor of the time mechanism and turning within the said central opening or recess, and the recording-dial detachably mounted on said carrier-plate, substantially as described.

2. In a road-vehicle speed and distance meter, the combination of a two-part separable inclosing casing $a^2$, $c^2$, a recording-dial $d$ arranged between said casing parts and carried by a time mechanism, a marking mechanism comprising parts $g$, $g^2$, $g^3$, $g^4$, $h^5$, $h^3$, and $h$, operated off the rotating part to be measured, and sight-indicating devices comprising parts $h^8$, $h^{10}$, and $m$, also worked off the rotating part to be measured, substantially as described.

3. The combination of the casing composed of two sections hinged together, and one having a wall constructed with a central circular opening or recess, the time mechanism, the marking mechanism, the circular recording-dial carrier-plate secured to the hour-arbor of the time mechanism and rotating in said central circular opening or recess, and the recording-dial detachably secured upon said carrier-plate, substantially as described.

4. The combination of the casing composed of two sections hinged together, a time mechanism located in one of said sections, a marking mechanism located in the other section, a recording-dial carrier-plate secured to the hour-arbor of the time mechanism and provided with prongs or projections, and a recording-dial having holes to register with and receive the prongs or projections of said carrier-plate, substantially as described.

5. In a road-vehicle speed and distance meter, the combination of a two-part casing $a^2$, $c^2$, respectively fitted and provided with a time-dial and fingers and an extension $f^2$ and a sight-hole $f$, a recording-dial $d$ arranged and carried, by means of a plate, upon the hour-arbor of the time mechanism so as to be easily renewable, and so as to work between the two parts of the casing, a perforating-lever $g$ inclosed within the casing's part $c^2$, and whose point is adapted to be within range of the recording-dial $d$, and be operated off a wheel once for every rotation of the said wheel, and the running down or reducing train of wheels for operating the perforating-lever and the sight-indicating devices, substantially as described.

In testimony whereof I affix my signature in presence of two witnesses.

HORACE GROVES SADGROVE.

Witnesses:
 GEO. YEARS,
 A. F. BIDDLE.